(12) United States Patent
Delaney et al.

(10) Patent No.: US 6,988,513 B2
(45) Date of Patent: Jan. 24, 2006

(54) PROPORTIONAL VALVE

(75) Inventors: Francois Delaney, L'Assomption (CA); Roman Teliszczuk, St-Francois Laval (CA)

(73) Assignee: Delaney Machinerie Inc., L'Assomption (CA)

( * ) Notice: Subject to any disclaimer, the term of this patent is extended or adjusted under 35 U.S.C. 154(b) by 246 days.

(21) Appl. No.: 10/692,846

(22) Filed: Oct. 27, 2003

(65) Prior Publication Data

US 2005/0087244 A1   Apr. 28, 2005

(51) Int. Cl.
*F16K 11/18* (2006.01)
*G05D 16/18* (2006.01)

(52) U.S. Cl. .............. 137/627.5; 137/596.18; 251/61.2; 251/61.5

(58) Field of Classification Search ............. 137/627.5, 137/596, 596.18, 596.2; 251/61, 61.2, 61.4, 251/61.5
See application file for complete search history.

(56) References Cited

U.S. PATENT DOCUMENTS

| | | | |
|---|---|---|---|
| 2,216,854 A * | 10/1940 | Sanford | .............. 152/416 |
| 3,727,623 A | 4/1973 | Robbins | |
| 3,797,803 A | 3/1974 | Goto et al. | |
| 4,130,266 A | 12/1978 | Bertling | |
| 4,392,512 A * | 7/1983 | Kreeley | .............. 137/496 |
| 5,485,984 A | 1/1996 | Itoi et al. | |
| 5,676,342 A | 10/1997 | Otto et al. | |
| 5,851,004 A | 12/1998 | Wu et al. | |
| 5,954,080 A | 9/1999 | Leatherman | |

* cited by examiner

*Primary Examiner*—Ramesh Krishnamurthy
(74) *Attorney, Agent, or Firm*—Protections Equinox Int'l; Franz Bonsang (57) ABSTRACT

A multistage proportional valve for controlling the pressure of a fluid inside a container includes a fluid outflow passageway having an exhaust opening, an actuatable fluid inflow passageway having an intake opening and an actuatable exhaust cover for selectively closing said exhaust opening. The fluid outflow passageway, actuatable fluid inflow passageway and actuatable exhaust cover are interconnected and configured such that in response to an actuating force reaching a first pre-determined threshold the valve displaces the exhaust cover to allow the fluid inside the container to exhaust there from through the fluid outflow passageway. In response to the actuating force reaching a second pre-determined threshold the valve displaces the fluid inflow passageway to allow pressurized fluid to flow there through inside the container.

24 Claims, 6 Drawing Sheets

PROPORTIONAL VALVE

FIELD OF THE INVENTION

The present invention relates to valves and is more particularly concerned with a multistage proportional valve.

BACKGROUND OF THE INVENTION

It is well known in the art to use valves, hydraulic or pneumatic, to control and direct the flow of a fluid between two or more locations. When more than two locations are considered, the multistage valve is usually controlled by at least two different actuators, either automatic or under manual operation, that control respective stages.

Furthermore, because of the use of automatic actuators, the effect is typically only a closed-open type configuration. In order to get either a proportional (continuous or progressive) closing or opening operation or a precise control operation, high accuracy from the actuator as well as precision machining of the different valve components are required which significantly increases the cost of such a valve. Moreover, a high precision valve typically requires the assembly of a large quantity of pieces which further increase the cost thereof. Also, because of the large quantity of pieces, the adjustment or calibration of such a valve is usually complex and needs to be performed by highly skilled technicians.

Even more precision is required when such a valve operates with a relatively low-pressure fluid.

Accordingly, there is a need for an improved multistage proportional valve with a simple configuration.

SUMMARY OF THE INVENTION

It is therefore a general object of the present invention to provide an improved proportional valve.

An advantage of the present invention is that the proportional valve is relatively simple to use with the control of a single button; the same control button being used to control by increasing, lowering or maintaining constant the fluid pressure inside a container, or the volume of an expandable container.

Another advantage of the present invention is that the proportional valve of relatively simple fabrication for easy manufacturing.

A further advantage of the present invention is that the proportional valve allow for a relatively wide proportional range of operation for the control of the fluid pressure inside a container.

Still another advantage of the present invention is that the proportional valve can be used with either low- or high-pressure fluids.

Another advantage of the present invention is that the proportional valve is simple to calibrate and adjust.

Still a further advantage of the present invention is that the proportional valve provides a smooth operation through and between the different operation stages by essentially eliminating the occurrence of pressure shocks or any shaking of the valve (backlash), among others because of the size and configuration of the diaphragm actuator. The latter is actuated by a pressure force with orders of magnitude larger than the force required to actually operate the valve, the displacement of the actuator induces operation of the valve.

According to an aspect of the present invention, there is provided a proportional valve for controlling the pressure of a fluid inside a container between first and second fluid pressure levels, the second pressure level being larger than the first pressure level, the container having an opening extending into an inner volume thereof, the proportional valve comprises: a fluid outflow passageway having an exhaust opening, the outflow passageway being in fluid communication with the container inner volume; an actuatable fluid inflow passageway having an intake opening; an actuatable exhaust cover for selectively closing the exhaust opening; the fluid outflow passageway, the actuatable fluid inflow passageway and the actuatable exhaust cover being interconnected and configured such that:

in response to a moving force reaching a first pre-determined threshold the actuatable exhaust cover is being displaced from a first cover position in which the exhaust cover is spaced apart from the exhaust opening to allow fluid to exhaust therethrough from the container inner volume to a second cover position in which the exhaust cover closes off the exhaust opening to prevent fluid from exhausting from the container inner volume; and in response to the moving force reaching a second pre-determined threshold the actuatable fluid inflow passageway is being displaced from a first inflow passageway position in which the fluid inflow passageway is closed to prevent fluid from flowing between the fluid inflow passageway and the container inner volume to a second inflow passageway position in which the fluid inflow passageway is in fluid communication with the fluid outflow passageway to allow fluid to flow between the fluid inflow passageway and the container inner volume.

Typically, the exhaust cover is displaced by a cover displacement amount between the first and second cover positions, and wherein the fluid inflow passageway is displaced by an inflow passageway displacement amount between the first and second inflow passageway positions.

Typically, the valve further comprises an actuator member connecting to the exhaust cover and the fluid inflow passageway, the actuator member providing the moving force for displacement of the exhaust cover and the fluid inflow passageway by the cover and inflow passageway displacement amounts, respectively.

In one embodiment, the actuator member is operable to first and second actuator displacement configurations, the first actuator displacement configuration corresponding to the exhaust cover and the fluid inflow passageway in the second cover position and the first inflow passageway position respectively, the second actuator displacement configuration corresponding to the exhaust cover and the fluid inflow passageway in the second cover position and the second inflow passageway position respectively.

Typically, the actuator member is operable in response to an actuating force, the actuating force inducing the first and second actuator displacement configurations when reaching first and second pre-determined force levels, respectively.

Typically, the first and second pre-determined force levels are between about one and about four orders of magnitude larger than the moving force, and preferably about two orders of magnitude larger than the moving force.

In one embodiment, the fluid outflow passageway extends through a valve seat mounted on the container and surrounding the opening thereof and wherein the fluid inflow passageway extends through an intake body movably connected to the valve seat, the actuatable exhaust cover movably mounting on the intake body.

Typically, the intake body includes a body biasing means urging the intake body in the first inflow passageway position.

Typically, the body biasing means urges the intake body in the first inflow passageway position with a pre-determined biasing force, the pre-determined biasing force being intermediate the first and second pre-determined threshold forces.

In one embodiment, the actuator member includes first and second actuator components connecting to the exhaust cover and the intake body, the actuating force displacing the first and second components relative to one another into the first and second actuator displacement configurations corresponding to the cover and inflow passageway displacement amounts, respectively.

Typically, the first and second actuator components are first and second resilient plate members respectively, the first and second plate members peripherally and sealably attaching to one another in a face-to-face configuration, the first and second plate members defining respective central section thereof and an actuator inner volume therebetween, the actuator inner volume being selectively in fluid communication with a source of pressurized fluid so as to selectively move the central sections away from one another into the first and second actuator displacement configurations.

Typically, the first and second plate members, when the central sections are positioned away from one another, form an actuator biasing spring urging central sections toward one another into an idle actuator configuration corresponding to the exhaust cover and the fluid inflow passageway in the first cover and first inflow passageway positions, respectively. Typically, the central sections connect to the exhaust cover and the intake body.

In one embodiment, the fluid inflow passageway is generally rectilinear and defines generally longitudinally opposed first and second inflow passageway ends and a longitudinal inflow passageway axis, the first and second inflow passageway ends being positioned generally adjacent and away from the valve seat respectively, the first inflow passageway end being in contact with and spaced apart from the valve seat when in the first and second inflow passageway positions, respectively.

Typically, the body biasing means includes an elongate plunger member extending longitudinally through the fluid inflow passageway and a compressive spring, the plunger member having a first longitudinal plunger end connected to the valve seat and a generally opposed second longitudinal plunger end connected to the inflow passageway at a position intermediate the first and second inflow passageway ends via the compressive spring, the compressive spring urging the first inflow passageway end in contact with the valve seat to close off the inflow passageway in the first inflow passageway position. Preferably, the compressive spring is a helical spring.

In one embodiment, the actuatable exhaust cover mounts on the first plate member for axial movement relative to the intake body adjacent the first inflow passageway end.

Typically, the actuator inner volume is in fluid communication with a source of a variable pressurized fluid so as to selectively adjust the fluid pressure therein such that the actuator member is adjustable between the idle actuator configuration and the first and second actuator displacement configurations.

In one embodiment, the central section of one of the first and second plate members includes an actuator opening extending therethrough, the actuator opening allowing the actuator inner volume to be in fluid communication with the source of variable pressurized fluid.

Typically, the central sections of the first and second plate members are in contact with the inflow passageway adjacent the first inflow passageway end and at a position intermediate the first and second inflow passageway ends, respectively.

Typically, the exhaust cover includes a locally generally flexible component to contact and sealably close off the exhaust opening in the second cover position.

In one embodiment, the exhaust and intake openings are connectable to fluids at the first and second pressure levels, respectively.

Typically, the second pre-determined threshold force is larger than first pre-determined threshold force.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, wherein.

DETAILED DESCRIPTION OF THE PREFERRED EMBODIMENTS

With reference to the annexed drawings the preferred embodiments of the present invention will be herein described for indicative purpose and by no means as of limitation.

Figure 1:
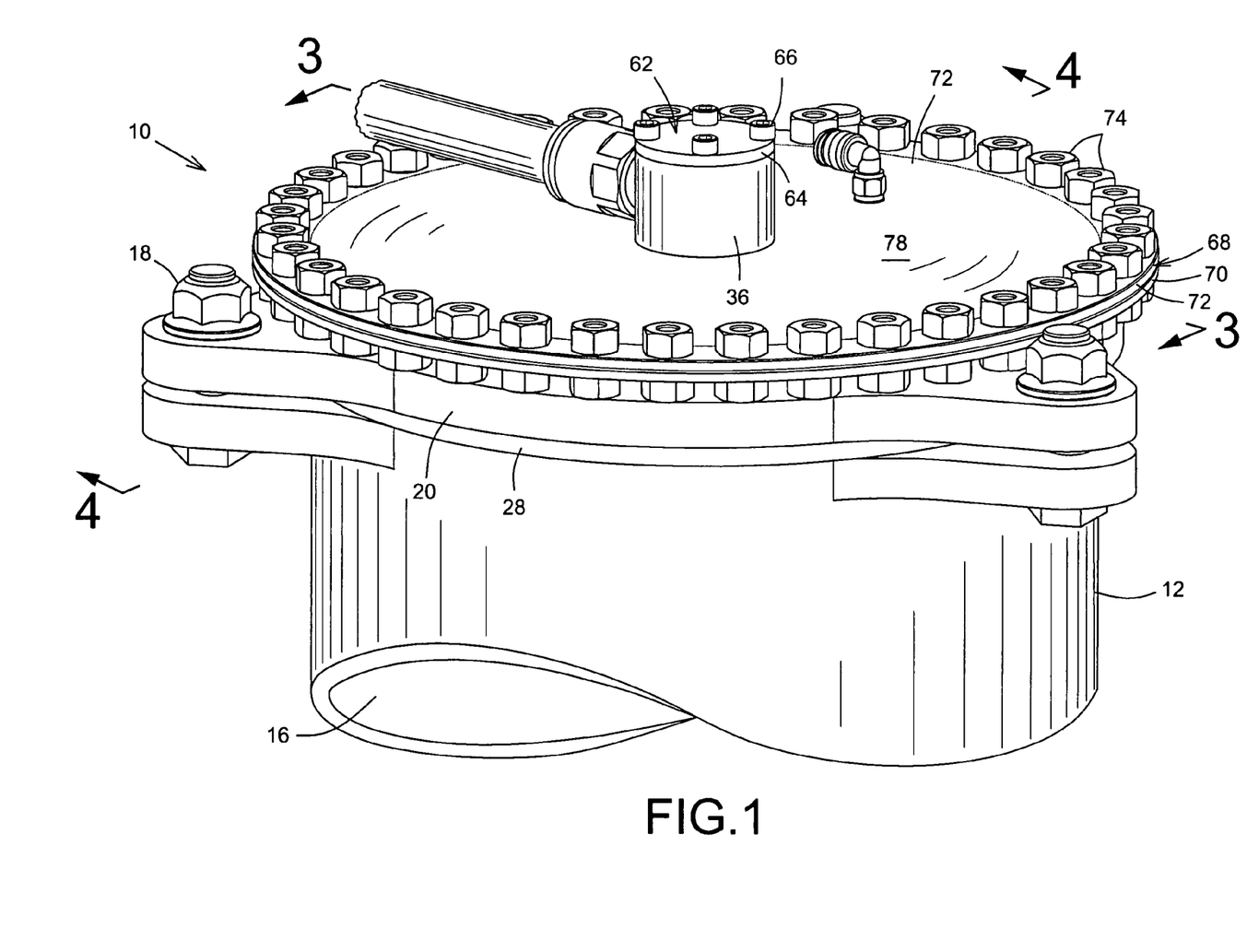
FIG. 1 is a top perspective view of an embodiment of a proportional valve in accordance with the present invention for the control of the fluid pressure inside a container.

Referring to FIG. 1, there is schematically shown an embodiment of a proportional valve 10 in accordance with the present invention securely attached to a container 12 via conventional bolt fasteners 18. The container 12 typically has a container opening 14 (see FIG. 3) extending into a container inner volume 16 thereof. The valve 10 is typically used to control the pressure of a fluid filling the container inner volume 16 between first and second fluid pressure levels. Obviously, the valve 10 could also be used to control the size of the container inner volume 16 by controlling the fluid flow in and out when the pressure remains substantially constant therein. The second pressure level is typically a positive pressure larger than the first pressure level that is usually the ambient environmental air pressure.

Figure 2:
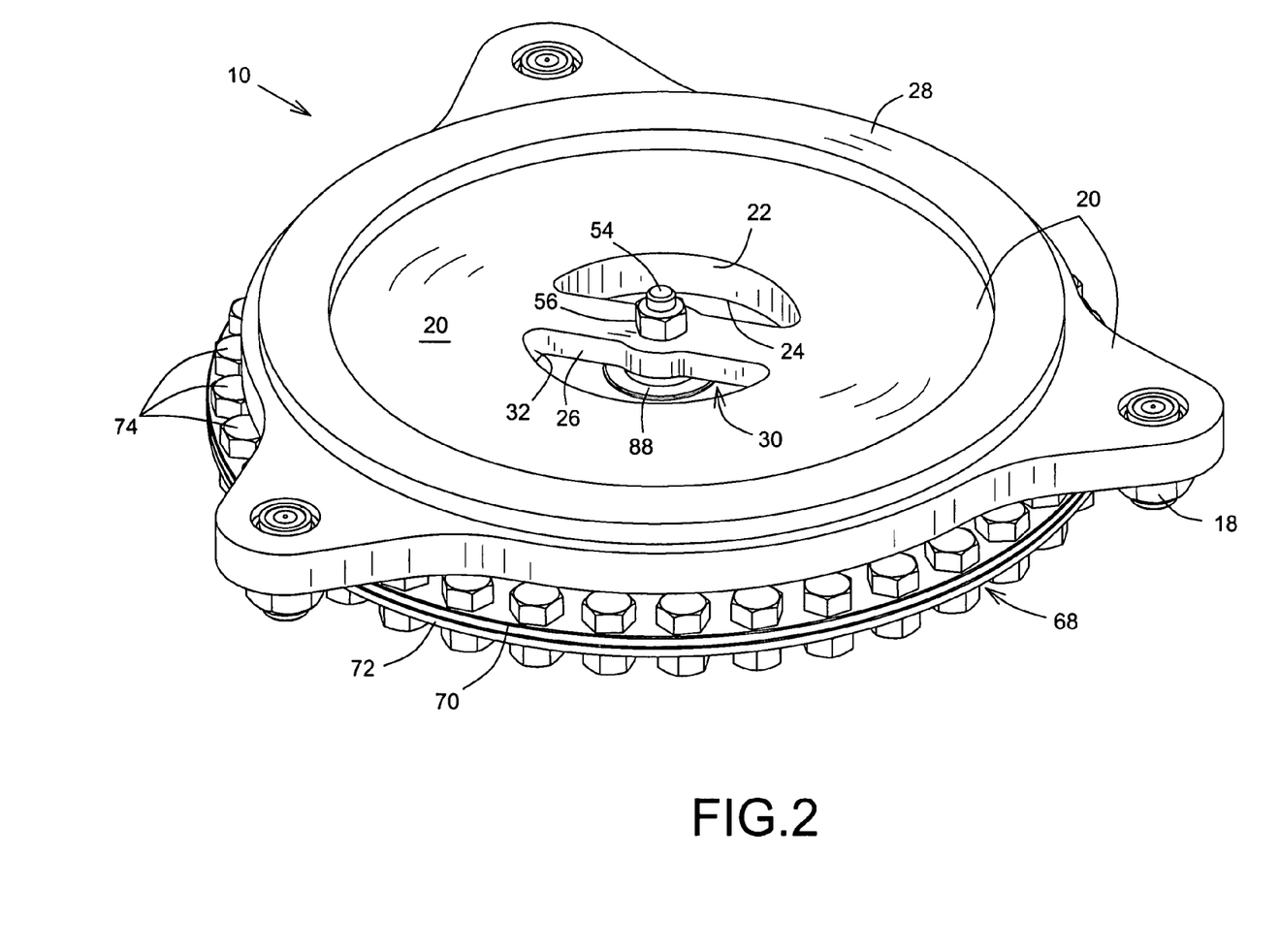
FIG. 2 is a bottom perspective view of the embodiment of FIG. 1, showing the fluid outflow passageway for communication with the container.

The proportional valve 10 includes a valve seat 20 mounted on the container 12 and surrounding the container opening 14. The valve seat 20 has a fluid outflow passageway 22 extending there through. The fluid outflow passageway 22 has an exhaust opening 24 and is in fluid communication with the container inner volume 16. The exhaust opening is typically so located to communicate with the external or ambient environment into which the fluid is exhausted to. The fluid outflow passageway 22 typically has a circular cross-section partially blocked by an attachment bar 26 that extends generally radially there through, as shown in FIG. 2.

Figure 3:
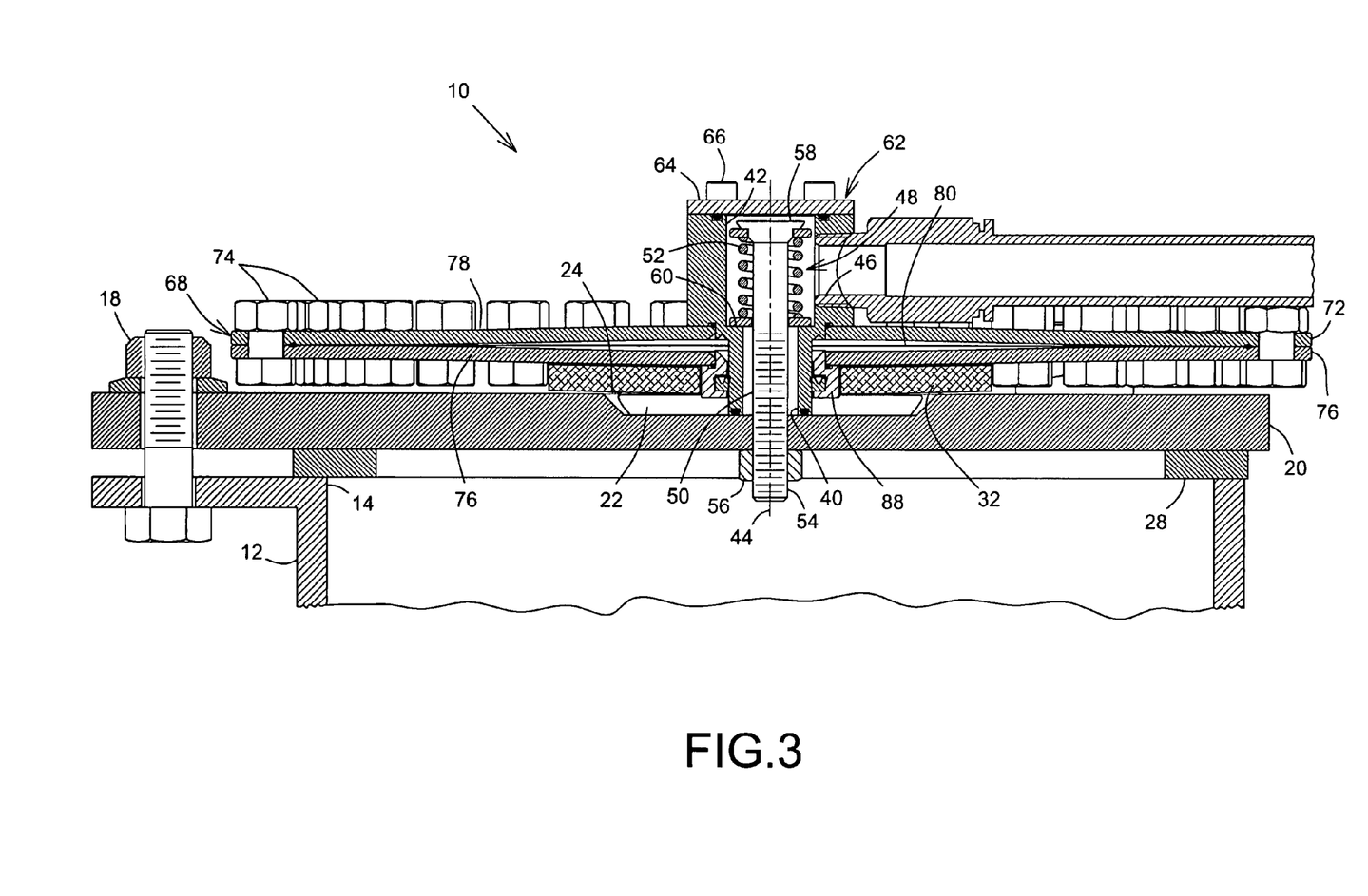
FIG. 3 is a section view taken along line 3—3 of FIG. 1, showing the proportional valve in a closed configuration, between the idle actuator configuration and first actuator displacement configuration.
Figure 3A:
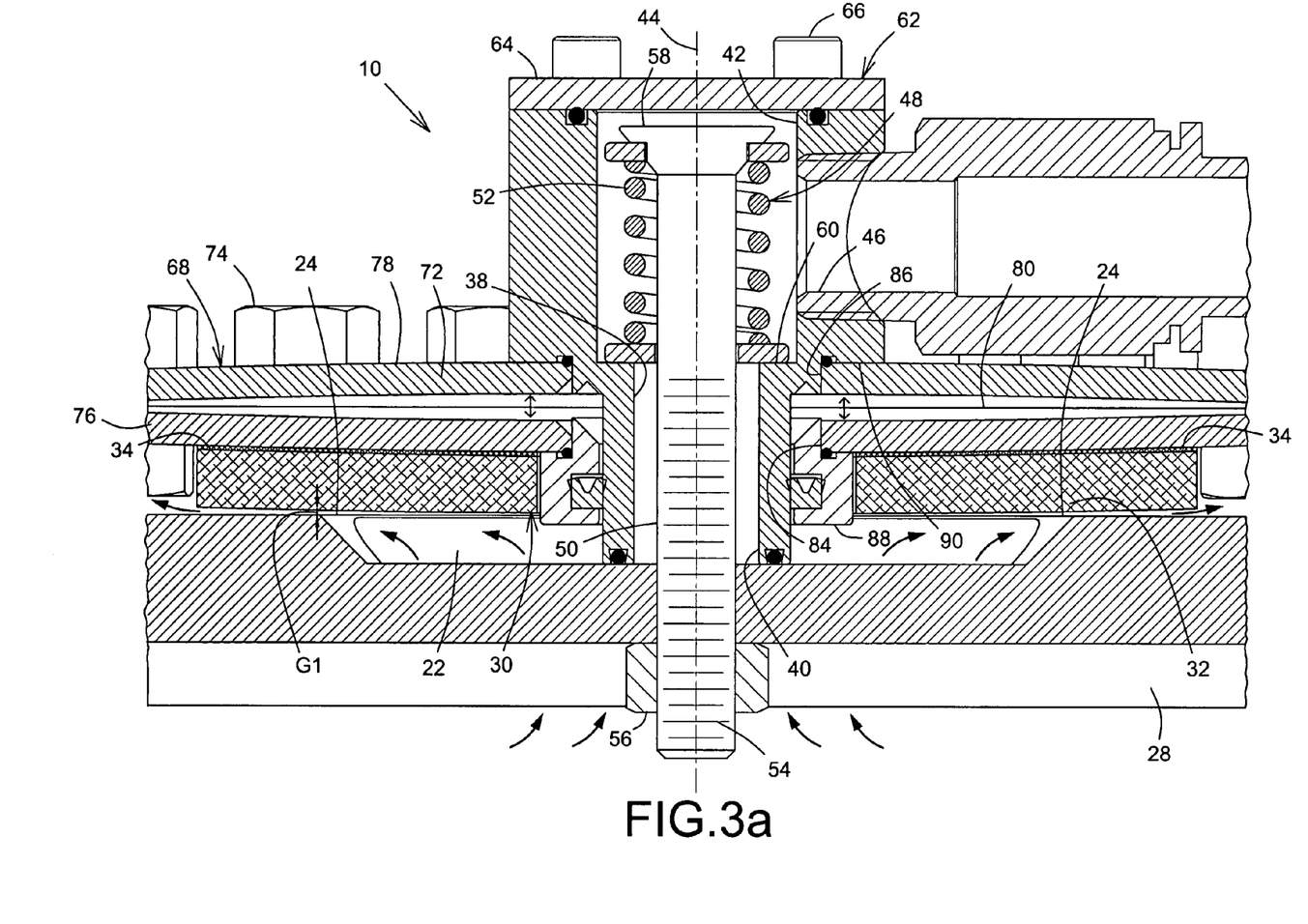
FIG. 3a is a partially broken enlarged section view taken in the central region of FIG. 3, showing the proportional valve in a closed configuration, between the closed idle and first actuator displacement configurations.
Figure 4:
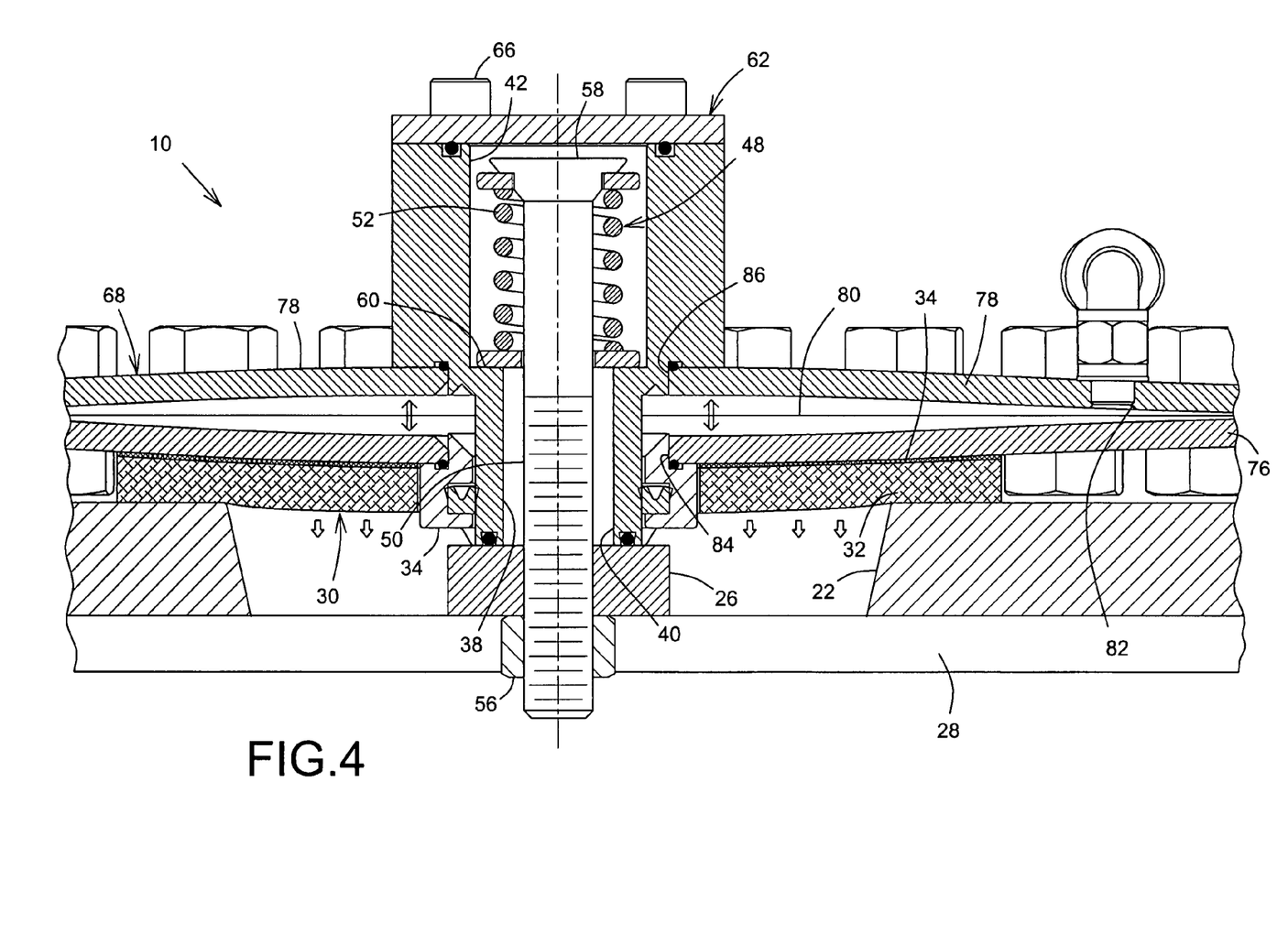
FIG. 4 is a partially enlarged section view taken along line 4—4 of FIG. 1, showing the proportional valve in the intermediate configuration, or first actuator displacement configuration, with the exhaust cover in the first cover position and the intake body in the first inflow passageway position, and showing the actuator opening of the diaphragm actuator for its connection to the supply of controlling fluid.
Figure 5:
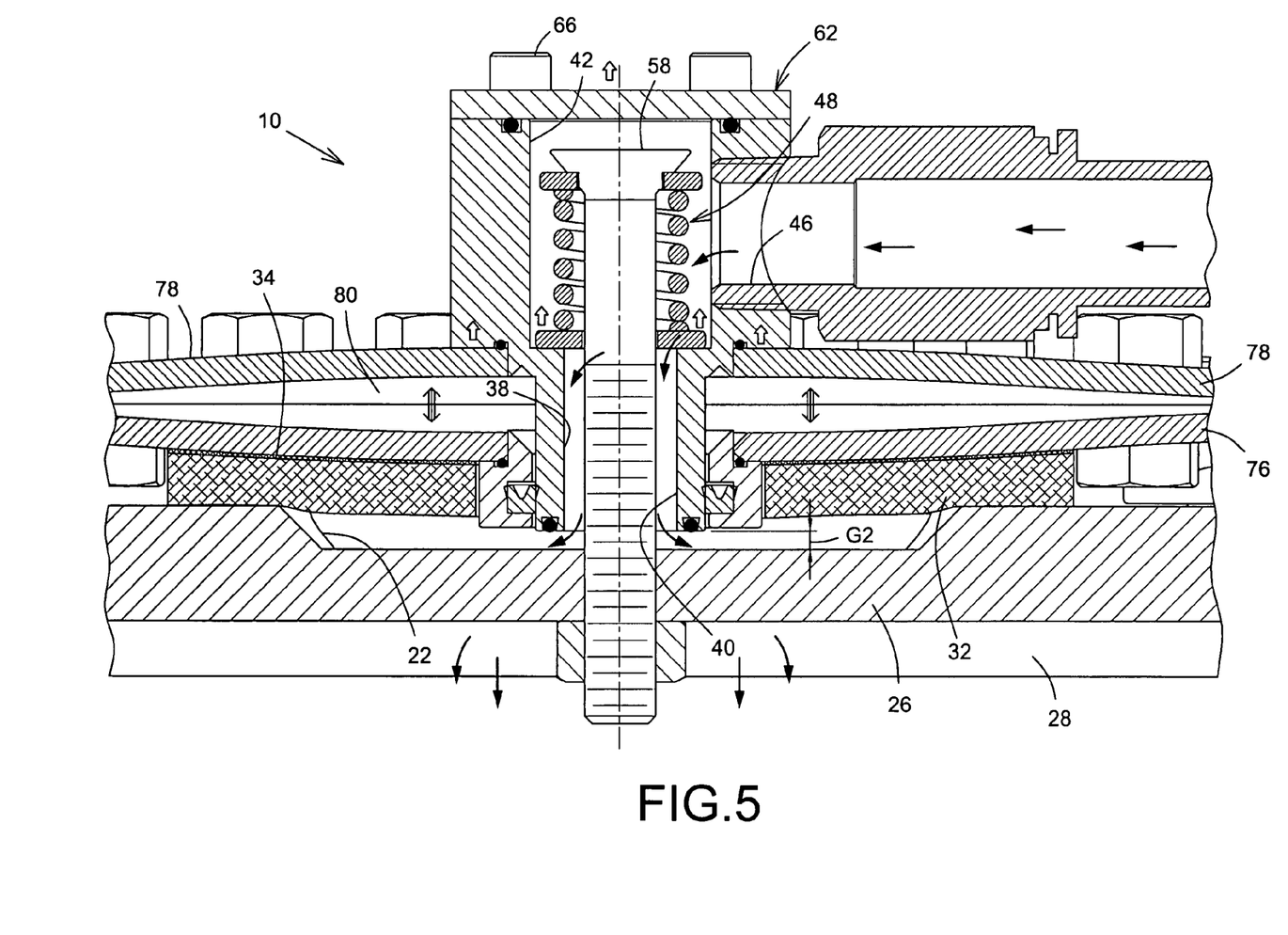
FIG. 5 is a partially enlarged section view similar to FIG. 3a, showing the proportional valve in the open configuration, or second actuator displacement configuration, with the exhaust cover in the second cover position and the intake body in the second inflow passageway position.

As shown more specifically in FIGS. 3 to 5, the container 12 is represented as a hollow post and its opening 14 is an open end thereof.

The open end is generally closed off by the valve seat 20 being in contact with the peripheral edge of the container opening 14 through a conventional flexible seal 28.

An actuatable exhaust cover 30 is used to selectively close off the exhaust opening 24. The exhaust cover 30 is actuatable between a first cover position approximately shown in FIG. 3 in which the exhaust cover 30 is spaced apart form the exhaust opening 24 by a first gap G1 there between to allow fluid to exhaust there through from the container inner volume 16 (see dark arrows in FIG. 3) and a second cover position shown in FIGS. 4 and 5 in which the exhaust cover 30 closes off the exhaust opening 24 to prevent fluid from exhausting from the container inner volume 16. The actuatable exhaust cover 30 is displaced by a cover displacement amount, from the first cover position to the second cover position, in response to a moving force reaching a first pre-determined threshold.

An actuatable intake body 36 is connected to the attachment bar 26 of the valve seat 20 and has a fluid inflow passageway 38 that extends there through. The fluid inflow passageway 38 is actuatable between a first inflow passageway position shown in FIGS. 3 and 4 in which the fluid inflow passageway 38 is closed to prevent fluid from flowing between the fluid inflow passageway 38 and the container inner volume 16, and a second inflow passageway position shown in FIG. 5 in which the fluid inflow passageway 38 is spaced apart form the attachment bar 26 by a second gap G2 there between to be in fluid communication with the fluid outflow passageway 22 to allow pressurized fluid to flow (see dark arrows in FIG. 5) between the fluid inflow passageway 38 and the container inner volume 16. The actuatable fluid inflow passageway 38 is displaced by an inflow passageway displacement amount, from the first inflow passageway position to the second inflow passageway position, in response to the moving force reaching a second pre-determined threshold. Typically, the second pre-determined threshold force is larger than first pre-determined threshold force such that the exhaust cover 30 is actuated before the fluid inflow passageway 38 is.

The fluid inflow passageway 38 is substantially rectilinear and defines generally longitudinally opposed first and second inflow passageway ends 40,42 and a longitudinal inflow passageway axis 44 extending there between. The first inflow passageway end 40 is positioned generally adjacent the valve seat 20. The fluid inflow passageway 38 has an intake opening 46 connectable to the fluid source with a positive pressure. The intake opening 46 is typically located adjacent the second inflow passageway end 42 generally away from the valve seat 20.

The intake body 36 includes a body biasing means 48 that urges the intake body 36 in the first inflow passageway position with a pre-determined biasing force that is typically intermediate the first and second pre-determined threshold forces. The body biasing means 48 typically includes an elongate plunger member such as a screw 50 extending longitudinally, typically coaxially, through the fluid inflow passageway 38 and a compressive spring, such as a compressive helical spring 52.

The plunger member 50 has a first longitudinal plunger end 54, typically the threaded end of the screw, connected to the attachment bar 26 of the valve seat 20 using a fastener such as a nut 56 engaging the threads. A generally opposed second longitudinal plunger end 58, typically the head of the screw, is connected to the fluid inflow passageway 38 at a position intermediate the first and second inflow passageway ends 40,42 via the compressive spring 52. The compressive spring 52 extends between an internal shoulder 60 of the fluid inflow passageway 38 located intermediate the first and second inflow passageway ends 40,42 and the head 58 of the screw 50 located adjacent the second inflow passageway end 42. In this position, the compressive spring 52 urges the second longitudinal plunger end 58 (screw head) away from the valve seat 20 and the first inflow passageway end 40 in general abutment contact with the attachment bar 26 to close off the fluid inflow passageway 38 in the first inflow passageway position. The first inflow passageway end 40 is spaced apart from the valve seat 20 by second gap G2 when in the second inflow passageway position.

The second inflow passageway end 42 has an assembly opening 62 allowing for the assembly of the body biasing means 48 inside the fluid inflow passageway 38 to the attachment bar 26 using the nut 56. The assembly opening 62 is typically closed off by an assembly cover 64 using conventional screw fasteners 66.

Typically, the actuatable exhaust cover 30 is longitudinally movably connected to the intake body 36 adjacent the first inflow passageway end 40. The exhaust cover 30 includes a locally generally flexible component 32 located adjacent the first inflow passageway end 40 of the intake body 36. The flexible component 32 is typically made out of a compressible material, such as rubber or the like, to ensure a closing off of the exhaust opening 24 with a generally sealed air tight contact at the local periphery thereof when in the second cover position shown in FIGS. 4 and 5. Obviously, the material used for the exhaust cover 30 and more specifically for the flexible component 32 is not necessarily "flexible" as long as an air tight contact is provided locally at the interface between the exhaust cover 30 and the valve seat 20. A metal-metal interface could eventually be considered without departing from the scope of the present invention.

Typically, the valve 10 also includes an actuator member 68 that connects to the exhaust cover 30 and the fluid inflow passageway 38.

The actuator 68 displaces, typically successively, the exhaust cover 30 and the fluid inflow passageway 38 by their respective cover and inflow passageway displacement amounts by providing the required moving force.

The actuator 68 is operable to idle actuator configuration and first and second actuator displacement configurations. The idle actuator configuration, approximately shown in FIGS. 3 and 3a, corresponds to the exhaust cover 30 and the fluid inflow passageway 38 in the first cover and first inflow passageway positions respectively. The first actuator displacement configuration, shown in FIG. 4, corresponds to the exhaust cover 30 and the fluid inflow passageway 38 in the second cover position and first inflow passageway position respectively. The second actuator displacement configuration, shown in FIG. 5, corresponds to the exhaust cover 30 and the fluid inflow passageway 38 in the second cover position and the second inflow passageway position respectively.

The actuator 68 is operable in response to an actuating force, represented by double-arrows in FIGS. 3a, 4 and 5, that induces the first and second actuator displacement configurations when reaching first and second pre-determined force levels, respectively.

The preferably diaphragm-type actuator 68 includes first and second actuator components, typically substantially flexible rigid plates 70,72, connected to the exhaust cover 30 and the intake body 36. The first and second plates 70,72 are preferably continuously movable relative to one another between idle actuator configuration and first and second actuator displacement configurations.

The first and second plates 70,72, typically having a disc shape preferably and generally planar in idle actuator configuration (not shown), are peripherally and sealably attach to one another in a face-to-face configuration using a plurality of conventional bolts 74 uniformly spaced apart. The first and second plates 70,72 define respective central section 76,78 thereof and an actuator inner volume 80 there between. As shown in more details in FIG. 4, one of the plates 70,72, preferably the second plate 72 because of its accessibility includes an actuator opening 82 that extends through its central section 78. The actuator opening 82 allows the actuator inner volume 80 to be selectively in fluid communication with a source of pressurized fluid to selectively move the first and second central sections 76,78 away from one another from the idle actuator configuration toward the second actuator displacement configuration. Although not shown herein, in the idle actuator configuration with zero pressure force inside the actuator inner volume 80, the first and second plates 70, 72 could have a slightly concave shape similar to the illustration of FIG. 3a without departing from the scope of the present invention.

Typically, the source of a pressurized fluid has a pressure that is preferably variable to selectively adjust the fluid pressure inside the actuator inner volume 80 such that the actuator 68 is adjustably operable at the idle actuator configuration, at the first and second actuator displacement configurations and at any position there between.

The first and second plates 70,72 are typically made out of an elastically deformable rigid material that would deform under relatively large pressure force levels, such that when the central sections 76,78 are positioned away from one another the two plates 70,72 form a biasing spring that urges the central sections 76,78 toward one another in the idle actuator configuration. The diaphragm biasing spring also urges the exhaust cover 30 in the first cover position since the exhaust cover 30 is typically bonded onto the central section 76 of the first plate 70 using any conventional bonding agent 34 or the like.

It would be obvious to one skilled in the art that a cover biasing means, such as a compressive spring between the exhaust cover 30 and the valve seat 20, could be used to bias the exhaust cover 30 in the cover first position without departing from the scope of the present invention. Also, one skilled in the art would recognize that the valve 10 would operate without any cover biasing means or bonding agent 34, with the fluid pressure inside the container inner volume 16 and the fluid outflow passageway 22 pushing the exhaust cover 30 away from the second cover position. Similarly, the gravity could simply push the exhaust cover 30 away from the second cover position when the valve is used in the reversed up-side-down configuration than the configuration shown throughout the Figures.

Accordingly, both first and second pre-determined force levels required to displace the first and second plates 70, 72 away form each other in the first and second actuator displacement configurations shown in FIGS. 4 and 5 respectively are typically between about one (10 times) and about four (10000 times) orders of magnitude larger than the moving force required to operate the valve 10. Preferably, the first and second pre-determined force levels are about two orders of magnitude (100 times) larger than the moving force.

This difference in magnitude between the actuating force and the moving force allows for a precise and accurate operation of the valve 10 by typically controlling up to about a ten-thousandth of an inch (0.0001 in), or two and a half micrometers (2.5 μm), the actual distance separating the two central sections 76, 78 which successively determines the size of the first and second gaps G1, G2 to effectively control the flow of fluid passing through the exhaust and intake openings 24, 46 respectively. This difference in magnitude between the actuating force and the moving force also enhances the operation stability of the valve 10.

Typically, the central sections 76,78 of the first and second plates 70,72 have a central bore 84,86 extending there through. The central bore 84,86 of the first and second plates 70,72 are typically engaged by the intake body 36. Accordingly, the first and second central sections 76,78 are typically in abutment contact with a guiding cylinder 88 axially slidably mounted on the intake body 36 adjacent the first inflow passageway end 40 and with an external shoulder 90 of the intake body 36 at a position intermediate the first and second inflow passageway ends 40,42, respectively.

Although not specifically disclosed hereinabove, it would be obvious to one skilled in the art that all interfaces between components are generally air tight sealed to prevent any air leaks thereat.

Operation

The multistage proportional valve 10 of the present invention is easily operable by an operator through a single control button (not shown) that controls the fluid pressure inside the inner volume 80 of the diaphragm actuator 68. Using this valve 10 secured to a container 12, the operator controls the fluid pressure inside the container 12 when the inner volume 16 is substantially constant, or the size of the inner volume 16 when the pressure therein is substantially constant depending on the specific application.

In the closed, or idle, first valve configuration, the valve 10 typically allows the fluid inside the container 12 to exhaust into the environment through the fluid outflow passageway 22 with the exhaust cover 30 in the first cover position and the fluid inflow passageway 38 in the first inflow passageway position.

By activating the control button, the operator allows for the fluid pressure inside the diaphragm inner volume 80 to gradually increase the pressure force (shown by single double-arrows in FIG. 3a) therein that displaces the central section 76 of the first plate 70 to force the guiding cylinder 88 to gradually slide along the intake body 36. By displacing the central section 76 of the first plate 70, the actuator 68 also gradually displaces the exhaust cover 30 bonded thereon from the first cover position toward the second cover position to gradually decrease the first gap G1 or the opening of the exhaust opening 24, as shown in FIGS. 3 and 3a. Effectively, the operator controls the progressive closing of the exhaust opening 24 to control the exhaust flow rate of the fluid escaping out from the container 12.

When the diaphragm actuator 68 provides for a pressure or actuating force equal to the first pre-determined force level corresponding to the first actuator displacement configuration, the moving force on the valve 10 reaches the first pre-determined threshold force onto the exhaust cover 30 to displace the latter such that it fully closes off the exhaust opening 24 by abutting against the valve seat 20. At this point, the valve 10 is in the intermediate second valve configuration to maintain the fluid pressure constant inside the container 12 with the exhaust cover 30 in the second cover position and the fluid inflow passageway 38 still in the first inflow passageway position.

By further activating the control button, the operator allows for the fluid pressure inside the diaphragm inner volume 80 to further gradually increase until the diaphragm actuator 68 provides for a pressure force (shown by double double-arrows in FIG. 4) to operate between the first and second actuator displacement configurations. The actuator 68 induces then a moving force between the first and the second pre-determined threshold force onto the exhaust cover 30 that squeezes the latter between the first plate 70 and the valve seat 20 with the intake body 36 still in the first inflow passageway position, as shown in FIG. 4.

When the induced moving force reaches the second pre-determined threshold force, the central section 78 of the second plate 72 starts pushing on the intake body 36 from the first inflow passageway position toward the second inflow passageway position away from the valve seat 20, against the biasing force of the body biasing means 48 by compressing the compressive spring 52. The further gradual displacement of the intake body 36 from this point gradually increases the second gap G2 to control the intake flow rate of the intake high pressure fluid entering in the container 12 form the intake opening 46.

By further activating the control button, the operator allows for the fluid pressure inside the diaphragm inner volume 80 to further gradually increase until the diaphragm actuator 68 provides for a pressure force (shown by triple double-arrows in FIG. 5) equal to the second pre-determined force level corresponding to the second actuator displacement configuration to fully open the valve 10. At this point, the valve 10 is in the open third valve configuration to allow the intake high pressure fluid to fully reach the container inner volume 16 and increase the fluid pressure therein with the exhaust cover 30 still in the second cover position and the fluid inflow passageway 38 in the second inflow passageway position, as shown in FIG. 5.

To successively return to the second and the first valve configurations, the operator gradually releases the control button. Obviously, one skilled in the art would have understood that the operator could control the valve 10 by alternating between the first and second valve configurations, or between the second and third valve configurations, depending on the specific application needs.

Although not required, the fluid source connected to the intake opening 46 is typically a high flow fluid source (high CFMs (Cubic Foot per Minute)) at a low-pressure level to ensure that the fluid pressure does not induce a force on the valve seat 20 sufficient to exceed the biasing force of the compressive spring 52 and open the valve 10. Similarly, the fluid source connected to the control actuator opening 82 is typically a small flow fluid source (low CFMs) at a low-pressure level since the size of the diaphragm plates 70,72 makes the pressure force levels large more than enough to counteract the selected biasing force of the compressive spring 52.

Alternatives

As detailed hereinabove, the exhaust and intake openings 24,46 are typically connectable to fluids at a positive and ambient pressure levels, respectively. Obviously, one skilled in the art would understand that the reverse configuration could be considered without departing from the scope of the present invention.

Furthermore, it would be obvious to one skilled in the art that the interconnection between the valve seat 20, the exhaust cover 30 and the intake body 36 could be modified such that the valve 10 would be in an idle open first configuration and actuatable to reach an intermediate second and a closed third configurations without departing from the scope of the present invention.

Also, the present invention is not limited to a diaphragm actuator 68 but other types of actuators, such as an electrical stepper motor (not shown) connected to a worm screw (not shown) to actuate the exhaust cover 30 and to the intake body 36, could be considered without departing from the scope of the present invention.

Moreover, although the present embodiment 10 has been described for use with air fluids, it would be obvious to one skilled in the art that any other fluid in either a gaseous or a liquid state could be considered without departing from the scope of the present invention, as long as appropriate and well-known mechanical (stresses, fatigue, etc.), material (type, compatibility, etc.) and chemical (corrosion, environment, etc.) concerns are being taken care of.

Although the present multistage proportional valve has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

We claim:

1. A proportional valve for controlling the pressure of a fluid inside a container between first and second fluid pressure levels, said second pressure level being larger than said first pressure level, said container having an opening extending into an inner volume thereof, said proportional valve comprising:
    a fluid outflow passageway having an exhaust opening, said outflow passageway being in fluid communication with the container inner volume;
    an actuatable fluid inflow passageway having an intake opening;
    an actuatable exhaust cover for selectively closing said exhaust opening;
    said fluid outflow passageway, said actuatable fluid inflow passageway and said actuatable exhaust cover being interconnected and configured such that:
        in response to a moving force reaching a first pre-determined threshold said actuatable exhaust cover is being displaced from a first cover position in which said exhaust cover is spaced apart from said exhaust opening to allow fluid to exhaust therethrough from the container inner volume to a second cover position in which said exhaust cover closes off said exhaust opening to prevent fluid from exhausting from the container inner volume; and
        in response to the moving force reaching a second pre-determined threshold said actuatable fluid inflow passageway is being displaced from a first inflow passageway position in which said fluid inflow passageway is closed to prevent fluid from flowing between said fluid inflow passageway and the container inner volume to a second inflow passageway position in which said fluid inflow passageway is in fluid communication with said fluid outflow passageway to allow fluid to flow between said fluid inflow passageway and the container inner volume.

2. The valve of claim 1, wherein said exhaust cover is displaced by a cover displacement amount between said first and second cover positions, and wherein said fluid inflow passageway is displaced by an inflow passageway displacement amount between said first and second inflow passageway positions.

3. The valve of claim 2, further comprising:
an actuator member connecting to said exhaust cover and said fluid inflow passageway, said actuator member providing the moving force for displacement of said exhaust cover and said fluid inflow passageway by said cover and inflow passageway displacement amounts, respectively.

4. The valve of claim 3, wherein said actuator member is operable to first and second actuator displacement configurations, said first actuator displacement configuration corresponding to said exhaust cover and said fluid inflow passageway in said second cover position and said first inflow passageway position respectively, said second actuator displacement configuration corresponding to said exhaust cover and said fluid inflow passageway in said second cover position and said second inflow passageway position respectively.

5. The valve of claim 4, wherein said actuator member is operable in response to an actuating force, said actuating force inducing said first and second actuator displacement configurations when reaching first and second pre-determined force levels, respectively.

6. The valve of claim 5, wherein said first and second pre-determined force levels are between about one and about four orders of magnitude larger than the moving force.

7. The valve of claim 6, wherein first and second pre-determined force levels are about two orders of magnitude larger than the moving force.

8. The valve of claim 6, wherein said fluid outflow passageway extends through a valve seat mounted on the container and surrounding the opening thereof and wherein said fluid inflow passageway extends through an intake body movably connected to said valve seat, said actuatable exhaust cover movably mounting on said intake body.

9. The valve of claim 8, wherein said intake body includes a body biasing means urging said intake body in said first inflow passageway position.

10. The valve of claim 9, wherein said body biasing means urges said intake body in said first inflow passageway position with a pre-determined biasing force, said pre-determined biasing force being intermediate said first and second pre-determined threshold forces.

11. The valve of claim 10, wherein said actuator member includes first and second actuator components connecting to said exhaust cover and said intake body, the actuating force displacing said first and second components relative to one another into said first and second actuator displacement configurations corresponding to said cover and inflow passageway displacement amounts, respectively.

12. The valve of claim 11, wherein said first and second actuator components are first and second resilient plate members respectively, said first and second plate members peripherally and sealably attaching to one another in a face-to-face configuration, said first and second plate members defining respective central section thereof and an actuator inner volume therebetween, said actuator inner volume being selectively in fluid communication with a source of pressurized fluid so as to selectively move said central sections away from one another into said first and second actuator displacement configurations.

13. The valve of claim 12, wherein said first and second plate members, when said central sections are positioned away from one another, form an actuator biasing spring urging central sections toward one another into an idle actuator configuration corresponding to said exhaust cover and said fluid inflow passageway in said first cover and first inflow passageway positions, respectively.

14. The valve of claim 13, wherein said central sections connect to said exhaust cover and said intake body.

15. The valve of claim 14, wherein said fluid inflow passageway is generally rectilinear and defines generally longitudinally opposed first and second inflow passageway ends and a longitudinal inflow passageway axis, said first and second inflow passageway ends being positioned generally adjacent and away from said valve seat respectively, said first inflow passageway end being in contact with and spaced apart from said valve seat when in said first and second inflow passageway positions, respectively.

16. The valve of claim 15, wherein said body biasing means includes an elongate plunger member extending longitudinally through said fluid inflow passageway and a compressive spring, said plunger member having a first longitudinal plunger end connected to said valve seat and a generally opposed second longitudinal plunger end connected to said inflow passageway at a position intermediate said first and second inflow passageway ends via said compressive spring, said compressive spring urging said first inflow passageway end in contact with said valve seat to close off said inflow passageway in said first inflow passageway position.

17. The valve of claim 16, wherein said compressive spring is a helical spring.

18. The valve of claim 17, wherein said actuatable exhaust cover mounts on said first plate member for axial movement relative to said intake body adjacent said first inflow passageway end.

19. The valve of claim 18, wherein said actuator inner volume is in fluid communication with a source of a variable pressurized fluid so as to selectively adjust said fluid pressure therein such that said actuator member is adjustable between said idle actuator configuration and said first and second actuator displacement configurations.

20. The valve of claim 19, wherein said central section of one of said first and second plate members includes an actuator opening extending therethrough, said actuator opening allowing said actuator inner volume to be in fluid communication with the source of variable pressurized fluid.

21. The valve of claim 20, wherein said central sections of said first and second plate members are in contact with said inflow passageway adjacent said first inflow passageway end and at a position intermediate said first and second inflow passageway ends, respectively.

22. The valve of claim 21, wherein said exhaust cover includes a locally generally flexible component to contact and sealably close off said exhaust opening in said second cover position.

23. The valve of claim 22, wherein said exhaust and intake openings are connectable to fluids at said first and second pressure levels, respectively.

24. The valve of claim 1, wherein said second pre-determined threshold force is larger than first pre-determined threshold force.

* * * * *